Patented Dec. 3, 1935

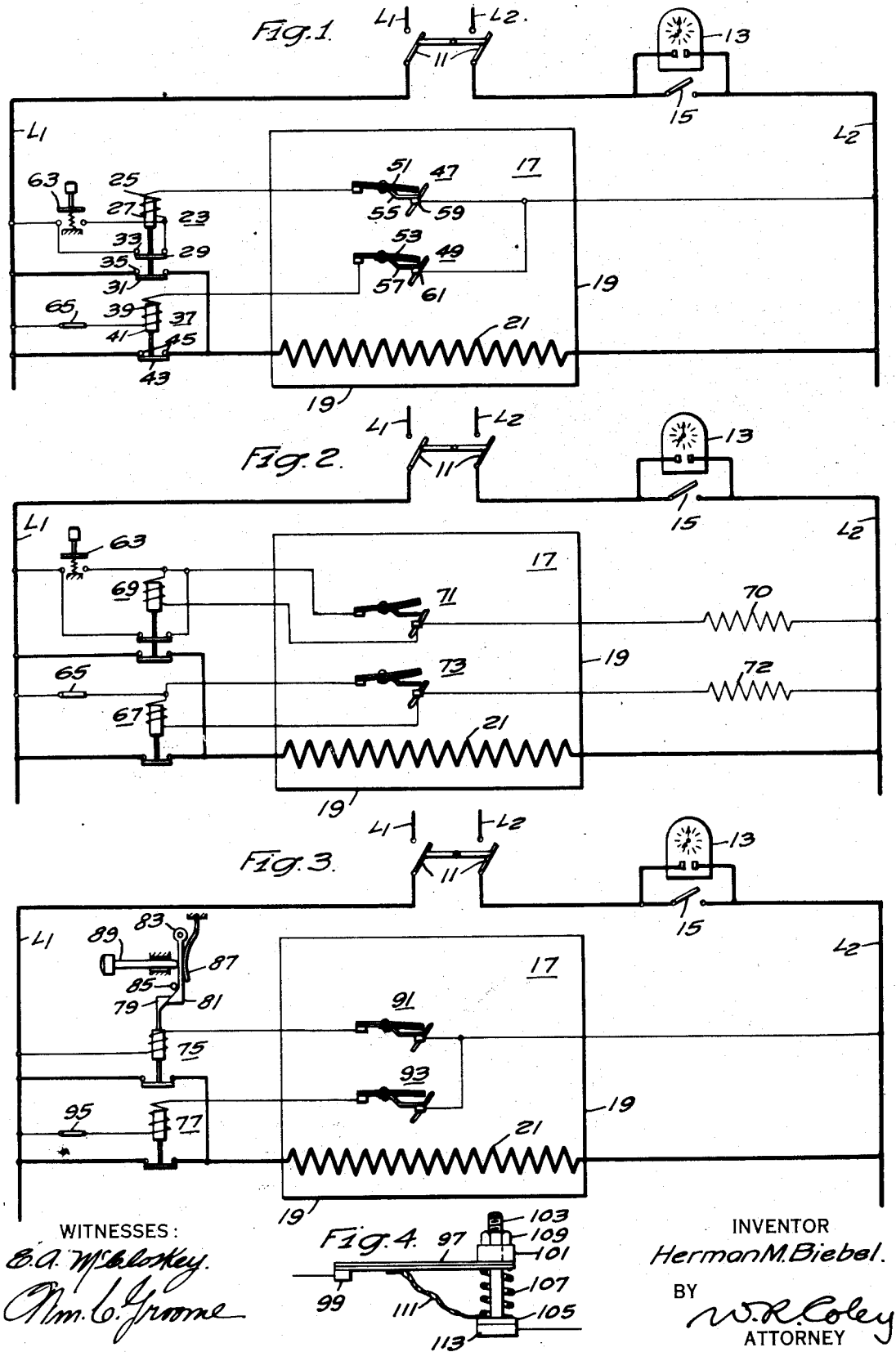

2,023,118

UNITED STATES PATENT OFFICE 2,023,118

RANGE CONTROL SYSTEM

Herman M. Biebel, Oakmont, Pa., assignor to Westinghouse Electric & Manufacturing Company, East Pittsburgh, Pa., a corporation of Pennsylvania Application March 30, 1934, Serial No. 718,277

10 Claims. (Cl. 219—20)

My invention relates to electric ranges and more particularly to control systems for range ovens.

An object of my invention is to provide a relatively simple and inexpensive assembly of control means to constitute a control system particularly adapted for ranges.

Another object of my invention is to provide means for enabling an operator to selectively practice any one of a number of different time temperature cycles in the oven of an electric range.

Another object is to provide a relatively simple thermo-electric control system for the cooking chamber of an electric range.

Other objects will either be apparent from the following description of the system or will be specifically pointed out hereinafter.

In practicing my invention, I provide a pair of contactors for individually controlling the energization of a heating element associated with the cooking chamber of an electric range, one of these contactors being a single-cycle contactor while the other is a plural-cycle contactor, and control the respective contactors by means of suitable thermal switches.

In the accompanying single sheet of drawing, Figure 1 is a diagrammatic view of a system embodying my invention, Fig. 2 is a diagrammatic representation of a modification of a range control system embodying my invention, Fig. 3 is a diagrammatic representation of a modified form of system and elements embodying my invention, and Fig. 4 is a view in front elevation of a modified form of thermal switch which I may utilize.

It has long been known that the best method of cooking a roast of meat is to first raise the temperature of at least the outer surface thereof to such a high value as will insure searing of the outside surface in order that the juice may be sealed therein, and then continuing the cooking operation at a reduced and sustained temperature. For purposes of illustration, it may be mentioned that the searing temperature need be only a momentary maximum or peak temperature which may, in the case of a roast of beef, be on the order of 500° F. The sustained or maintained temperature at which the cooking operation is to be finished or completed may be on the order of 300° F. or 400° F. In the ordinary gas heated range, it is necessary for the operator to make the desired temperature adjustments of a heat-controlled instrumentality manually at the desired or required times. My invention contemplates the use of relatively simple, electrical means for not only obtaining the momentary peak and then a maintained lower temperature but also of selectively obtaining either one of two other time-temperature cycles. These cycles are first a momentary peak temperature on the order of 500° F. and then a continuous and gradual decrease of the temperature of the cooking chamber, it being usual in a device of this kind to use a relatively large amount of heat-insulating and/or heat-storing material in the construction of the oven chamber. The second temperature cycle which may be utilized is that of a lower sustained or maintained temperature cycle which may be on the order of anywhere from 212° F. to 350° or 400° F., depending upon the particular cooking operation to be effected.

Reference is here made to my copending applications relating to similar subject matter, Serial Nos. 718,272, 718,273, 718,274, 718,275, and 718,276, and to an application by F. S. Wheeler, Serial No. 718,278, filed of even date herewith.

Referring first to Fig. 1 of the drawing, I have there illustrated a supply circuit including conductors $L_1$ and $L_2$ which are intended to represent generally any suitable or desired source of supply, which may be either a two wire source, as shown, or may be a three-wire source.

A main control switch is indicated schematically by a double blade knife switch 11 although it is desired that this switch be considered as indicative only of any one of a number of such control devices, preferably manual, as are now common in the art.

As I may employ a clock to start and stop the energization of the system, I have indicated such means by numeral 13 and it is to be understood that any one of a number of different devices of this kind now on the market may be utilized. A manually controlled switch 15 may be connected in parallel circuit relation to the clock in order to render it effective or ineffective as may be desired.

An oven chamber 17 has been indicated schematically as being enclosed by oven walls 19. Since the particular construction of the walls of the oven constitute no part of my present invention, I have indicated the oven schematically only.

A heating element operatively associated with and preferably located within the oven chamber 17 is indicated by numeral 21 and here again it is shown schematically only as any suitable or desired type of resistor adapted to be traversed by an electric current may be utilized. It is to be understood that the heating element 21 is of proper capacity, that is, that the value of current normally traversing the same is such as to raise the temperature in the oven chamber 17 to a value well above that which is necessary to properly cook any food irrespective of the amount or weight thereof.

I provide a single-cycle contactor 23 including an actuating coil 25, a movable armature core 27, two contact bridging members 29 and 31, together with stationary contact members 33 and 35 adapted to be respectively engaged by the individual contact bridging members. I further provide a second contactor 37 which may be called a plural-cycle contactor and embodies an actuating coil 39, a movable armature core 41, a contact bridging member 43 actuated thereby and cooperating with a pair of fixed contact members 45. The contact bridging member 31 and the cooperating contacts 35 are connected in series circuit with the resistor 21, the contact bridging member 43 and the contacts 45 being also connected in series circuit with resistor 21, in such manner that the circuit controlling contacts of the two contactors are electrically connected in parallel circuit relation with each other, whereby to severally and individually control the energization of heating element 21, it being understood that suitable connections are made between one terminal of resistor 21 and supply circuit conductor $L_2$ and also between one of the respective contact terminals 35 and 45 and supply circuit conductor $L_1$ in a manner well known in the art.

Means for individually controlling the energization of coils 25 and 39 include a thermal switch 47 located in heat-receiving location relatively to the oven chamber 17 as by being located therein and a second thermal switch 49 also located in heat-receiving relation to the oven chamber 17 and preferably therein. I have indicated thermal switches as including respectively bimetal arms 51 and 53, having the left-hand ends thereof fixedly mounted on suitable contact terminals while the other ends thereof are provided with resiliently supported contact arms 55 and 57, respectively, adapted to engage with and be disengaged from adjustably mounted contact terminals 59 and 61, respectively. The two terminals 59 and 61 are connected together and to supply circuit condictor $L_2$ in the manner shown in the drawing. The fixed contact terminals of the two switches are connected respectively to one terminal of the actuating coils 25 and 39.

The other terminal of coil 25 is electrically connected to supply circuit conductor $L_1$ through a manually actuable switch 63, which may be of the usual "start" type. That is, it is normally in its open position and is actuated to its closed position by a momentary operation thereof by an operator. Contactor 23 includes also electrical conductors so connected to coil 25 and to supply circuit conductor $L_1$ and cooperating with contacts 33 and contact bridging member 29 as to provide a holding circuit for the contactor 23 in a manner well known in the art. I provide also a manually actuable switch 65 in the circuit of actuating coil 39.

It may here be noted that the thermal switches 47 and 49 are shown schematically only and that any suitable or desired structure effective for the same purpose may be employed; that is, instead of the particular type of bimetal thermal switch shown, I may utilize an expansion bar, an expansion chamber device or any other form of thermal switch which will be effective to sequentially open and close its circuit. It may be noted also that the thermal switches 47 and 49 are of the kind in which the movable contact normally engages the adjustable fixed contact at the lower temperatures, and is disengaged therefrom at a certain higher temperature, which temperature is on the order of 300° F. in the case of thermal switch 49 and on the order of 500° F. in the case of thermal switch 47.

Referring now to Fig. 2 of the drawing, I have there illustrated a modification of the system shown in Fig. 1, including an oven chamber 17 enclosed by oven walls 19 and having a heating element 21 operatively associated therewith. The energization of heating element 21 is controlled by two parallel connected contactors, the first being a plural-cycle contactor 67, the second being a single-cycle contactor 69. The general design and construction of these contactors is substantially the same as has hereinbefore been set forth with regard to contactors 37 and 23, respectively, shown in Fig. 1 of the drawing. That is, the contactor 67 includes an actuating coil, a movable core member energized thereby and a contact bridging member and cooperating fixed contacts in the circuit of the heating element 21, while the contactor 69 includes not only the elements mentioned above as embodied in device 67 but in addition thereto a contact bridging member and contacts for a holding circuit for the contactor coil.

A pair of thermal switches 71 and 73 are located in heat-receiving relation relatively to the oven chamber 17 and again these may be of any suitable or desired construction, but in this case they are normally open, thermal switch 71 closing its circuit or engaging its adjustably fixed contact member at a temperature in the oven chamber on the order of 500° F., while switch 73 closes its circuit or engages its adjustably fixed contact at a temperature on the order of 300° F. When the thermal switches 71 and 73 engage their fixed contact member, they short circuit their cooperating actuating coils of the contactors 69 and 67, respectively, whereby to deenergize the contactors with resultant deenergization of the circuit controlled by the contactor contacts. In order to prevent an excessive current traversing the thermal switches under this condition I provide current limiting resistors 70 and 72 in the several circuits.

Referring now to Fig. 3 of the drawing, I have there illustrated a still furthed modification of a range system embodying my invention as applied to an oven chamber 17 having a heating element 21 associated therewith. Instead of utilizing an electrical means for preventing reclosing of the single-cycle contactor or for holding it in its open position, I provide a mechanical latch, as will be hereinafter explained.

The energization of heating element 21 is controlled by a pair of parallel-connected contactors 75 and 77, contactor 75 being a single-cycle contactor and contactor 77 being a plural-cycle contactor. Both contactors severally or individually control the energization of heating element 21 by means of the usual contact bridging members and fixed contact members. It may be stated that the contactors 75 and 77 comprise in addition to the circuit controlling parts, actuating coils and a movable armature in a manner well known in the art.

Means for insuring that contactor 75 will be held in its open position following its first movement to that position after having been energized to its closed position, may comprise a lug 79 thereon adapted to be engaged by a latch 81 which, as shown in Fig. 3 of the drawing, may be pivotally mounted at 83 and be biased toward the left, as illustrated, against a stop pin 85 by a spring 87. A manually-actuable push rod release 89 is provided, the operation of the latch with the contactor being such that when the armature of contactor 75 and the bridging member associated and movable therewith drop or move into the inoperative or deenergized position, the latch 81 will be moved to a position immediately above lug 79 to prevent movement of the armature and the contact bridging member to the position shown in Fig. 3 of the drawing where the circuit controlled thereby would be energized.

Contactor 75 is controlled by a thermal switch 91 which is of substantially the same type and design as was hereinbefore set forth for thermal switch 47 in Fig. 1 of the drawing. A second thermally actuable switch 93 is provided to control the energization of contactor 77, switch 93 being of substantially the same type and design as hereinbefore described for device 49 of Fig. 1. A manually actuable switch 95 is located in the circuit of the actuating coil of contactor 77 to permit of rendering the same effective and ineffective at the will of an operator.

I have illustrated in the several hereinbefore described figures of the drawing, thermal switches embodying resilient means (such as arm 55) for supporting the movable contact on the bimetal member and it may be well here to set forth the reason for this construction. Both of the thermal switches are located in heat-receiving relation with respect to the oven chamber 17 and as, under certain operating conditions, the thermal switch adjusted to operate at 300° F. or so will be subjected to a temperature of 500° or more, it is obvious that means must be provided to permit of subjecting the maintained temperature thermal switch to the peak temperature without destruction thereof or damage thereto. One form of device for obtaining this result is that shown in Figs. 1 to 3, respectively, of the drawing, namely, a resilient arm associated with the bimetal member.

Another form of thermal switch effective for the same purpose is shown in Fig. 4 of the drawing and includes a bimetal member or bar 97 having one end thereof mounted on a fixed contact terminal 99. The other end of the bimetal bar has secured thereto in any suitable manner a tubular guide member 101 through which there extends a rod 103 having a contact head 105 at its lower end, together with a helically wound compression spring 107 located between the contact head 105 and the bar 97. An adjusting nut 109 is located on the other screw threaded end of rod 103 whereby the initial compression of the spring 107 may be adjusted. A flexible lead 111 is also provided between head 105 and bar 97. Head 105 is adapted to operatively engage with and be disengaged from a substantially fixed contact member 113, which, however, is preferably made adjustable, like contact 59 of Fig. 1.

I desire to again state here that the showing of the thermal switches is schematic only, as the particular details of construction thereof constitute no part of my present invention, and it is within the province of my invention to use any known form of such devices operative for the intended purpose and in a manner now to be described. Thus, instead of utilizing thermally-actuable arms, I may use any other form of thermally actuable contact and may mount the adjustable (fixed) contact members on a dial.

Referring now particularly to Fig. 1 of the drawing, let it be assumed that it is desired to start with a substantially cold oven chamber, that is one whose temperature is substantially that of the room or kitchen in which it is located. Let it be assumed further that we desire to obtain a momentary peak temperature and then a lower sustained or maintained temperature, the respective values of which may be on the order of 500° F. and 300° F. Assume further that the operator closes switch 11 and also switch 15, that is, the time control is not desired, and also that switch 65 is closed manually, and that the start switch 63 is also closed momentarily. These manual operations will have the result of energizing both contactor 23 and contactor 37. As has already been hereinbefore stated, thermal switches 47 and 49 are so designed and constructed that they are in their respective closed positions at normal temperatures and up to temperatures depending upon their design, construction and adjustment. The energizing circuit through coil 39 is a direct one, and it is not believed necessary to specifically trace the same. The actuating coil 25 of contactor 23 will not be initially energized upon the closing of switches 11 and 15, but it is necessary that the operator momentarily close switch 63, as before stated, thereby providing a direct energizing circuit, causing operation of the two contact bridging members and the armature core thereof, contact bridging member 29 then cooperating with contacts 33 to provide a holding circuit in a manner well known in the art.

Energized heating element 21 effects a rise in the temperature of the cooking chamber 17, increasing gradually and somewhat in proportion to the amount of material located in cooking chamber 17. That is, the temperature rise of the thermal switches will be somewhat slower when a large amount of food, such as a large roast of meat, is located in the oven chamber than would be the case if a smaller quantity of food or meat were located therein. At a certain later time the temperature of thermal switch 49 will reach the value at which it will be actuated to its open position whereby actuating coil 39 is deenergized and bridging member 43 is disengaged from contacts 45. It is to be noted, however, that this actuation of contactor 37 to its open position will have no effect upon the energization of heating element 21, as the energization thereof is still continued through the single cycle contactor 23. This means that the temperature in oven chamber 17 will continue to rise until the temperature of thermal switch 47 reaches the value at which it will be actuated to its open position. It is, of course, to be understood that the two thermal switches are so designed, constructed, located and adjusted that the desired cooking effect will be obtained.

Upon actuation of switch 47 to its open position, coil 25 of contactor 23 is deenergized thereby causing interruption of the energizing circuit through contact bridging member 31 and the cooperating contacts 35, this circuit, of course, including heating element 21. The temperature in the oven chamber will, therefore, reach a momentary peak value only, in accordance with the several characteristics of the parts of the system and of the oven, after which the cooking chamber temperature will drop at a rate dependent upon the thermal characteristics of the assembly. It is, therefore, evident that at some value of temperature slightly below 500° (or that value for which thermal switch 47 was adjusted) thermal switch 47 will reclose, but this will have no effect upon contactor 23, since its holding circuit is open, and since manually actuable switch 63 is also in its open position. Switch 63 and its holding circuit thus form means to prevent reclosing of the circuit through the contactor by the action or operation of the thermally-actuable member 47 after having been actuated to open position thereby.

However, as soon as the temperature in oven chamber 17 has reached substantially 300° (or that for which thermal switch 49 was adjusted) thermal switch 49 will reclose, whereby actuating coil 39 is energized to reclose contactor 37 to reenergize heating element 21. This has the result that the temperature in the oven chamber will again increase, this increase continuing until thermal switch 49 again opens its circuit, whereby deenergization of heating element 21 is effected, the temperature dropping until it again reaches a point where thermal switch 49 recloses its circuit, thereby reenergizing contactor 37 and, therefore, heating element 21 to obtain a substantially constant average temperature in the cooking chamber. This alternate rise and fall of the temperature because of intermediate sequential energization and deenergization of the heating element will continue until the system is deenergized either by operation of the clock 13 or by manual operation of switch 11 by the operator.

Let it now be assumed that it is desired to obtain a maintained temperature cycle only in the oven chamber. The operator will manually close switches 11 and 15 or if clock control is desired, the clock will be properly actuated to effect closing of the circuit at a predetermined later time and switch 65 is also closed. As soon as the system is energized, coil 39 of contactor 37 is energized, whereby heating element 21 is energized to cause an increase in the temperature of the cooking chamber, and at a value of 300° F. (or at that value for which thermostat 49 has been adjusted) thermal switch 49 will open, deenergizing coil 39 to effect deenergization of heating element 21. The chamber temperature will then drop until thermal switch 49 recloses, thereby reenergizing contactor 37 and heating element 21, this continuing in alternate sequence to maintain a substantially constant average temperature in the cooking chamber until the system is deenergized.

If it is assumed that a peak temperature cycle only is desired, switch 65 is opened by the operator after which switches 11 and 15 may be closed (if clock control is not desired) and switch 63 is momentarily energized. The control of heating element 21 is now effected by the single-cycle contactor 23 in substantially the same manner as was hereinbefore set forth for the combined peak and maintained temperature cycle. That is, thermal switch 47 opens the circuit of contactor 23 at 500° F. or some other value for which thermal switch 47 was adjusted. The circuit through heating element 21 thereafter remains interrupted, cooking of the food placed in the oven chamber being effected by stored heat in a manner well known in the art.

Substantially the same kind of operation or the same kind of temperature control may be effected by the system shown in Fig. 2 of the drawing in which thermal switches 71 and 73 are initially open and are moved to closed positions to short circuit the actuating coils of the respective contactors 69 and 67 in a manner well known in the art. No further detailed description of the operation of the system shown in Fig. 2 of the drawing is, therefore, believed necessary.

Referring now to Fig. 3 of the drawing, the locking or latching means associated with the single-cycle contactor 75 is shown as a mechanical means rather than an electrical means such as was used hereinbefore in cooperation with contactors 23 and 69 respectively. Contactor 75 is shown in its energized position and when the temperature in oven chamber 17 has reached the maximum or peak value at which thermal switch 91 will be actuated to its open position, the movable parts of contactor 75 will move into their deenergized and/or interrupted position. This means that latch 81 will be located over the top of projection 79 and even if thermal switch 91 is moved to its closed position, the movable parts of contactor 75 cannot move into their closed position. It is only when an operator pushes on actuating rod 89 that the movable core and the contact bridging member of contactor 75 are permitted to move to the closed positions, providing, of course, that the actuating coil thereof is energized. It is, therefore, evident that substantially the same operation can be effected with the parts shown in Fig. 3 of the drawing as was set forth in detail for Fig. 1 of the drawing. It is further obvious that it is within the power of the operator to obtain either a maintained and substantially constant temperature within the cooking chamber, to obtain a momentary peak temperature in the cooking chamber or to obtain a combination of these in the form of a momentary peak temperature and then a lower maintained and substantially constant temperature therein. The switch 63 of Fig. 2 and the holding circuit of which it forms a part, and latch 81 of Fig. 3 constitute means to prevent reclosing of the contactor with which they are associated, by the cooperating thermal switch after having been actuated thereby into open position.

The device and/or system embodying my invention thus provides relatively simple, inexpensive, easily installed and readily operated means for controlling the temperature in an oven chamber whereby it is possible to obtain selectively any one of a number of different temperature cycles at the will of an operator.

Various further modifications may be made in the device or system embodying my invention without departing from the spirit and scope thereof, and I desire, therefore, that only such limitations shall be placed thereon as are imposed by the prior art or are set forth in the appended claims.

I claim as my invention:

1. In an electric cooking appliance including a cooking chamber and a heating element therefor, a pair of parallel-connected contactors severally controlling the energization of the heating element, a pair of thermostats actuated in response to variations in chamber temperature and operable at different temperatures, electric connections between the respective thermostats and the coils of the contactors whereby to control the contactors in accordance with chamber temperature, and means associated with one of the contactors to prevent a predetermined reversed operation thereof after having been operated to a predetermined position, whereby said one contactor and its cooperating thermostat control the energization of the heating element until a peak temperature is reached and then transfer the control of the energization of the heating element to the second contactor to thereafter maintain a second lower temperature.

2. In an electric cooking appliance including a cooking chamber and a heating element, means for controlling the heating element to obtain any one of a plurality of temperature cycles in the cooking chamber, said means comprising a pair of contactors severally controlling the energization of the heating element, a pair of thermostats subjected to chamber temperature and operable at different temperatures, electric connections between the respective thermostats and the contactors, whereby the thermostats individually control the contactors, means operatively associated with the contactor controlled by the thermostat operable at higher temperature for causing the contactor to remain in open position after having moved into such position, and means operatively associated with the respective contactors to render them effective and ineffective at the will of an operator, whereby upon rendering effective only that contactor controlled by the thermostat operable at lower temperature a maintained temperature cycle is obtained, upon rendering effective only that contactor controlled by the thermostat operable at higher temperature a peak temperature cycle is obtained and upon rendering both contactors effective a peak temperature and then a maintained temperature cycle is obtained in the cooking chamber.

3. In an electric cooking appliance including a cooking chamber and a heating element therefore, means for controlling the energization of the heating element to obtain first a peak temperature and then a maintained lower temperature in the cooking chamber, said means comprising a first contactor for the heating element, a first thermostat subject to chamber temperature for controlling said first contactor and operable at said maintained lower temperature, a second contactor for individually controlling the heating element, a second thermostat subject to chamber temperature for controlling said second contactor and operable at the peak temperature, electric connections between the contactor coils and their respective control thermostats and between the contactors to connect them in parallel-circuit with each other, means to render the contactors effective and ineffective at the will of an operator, and means operatively associated with said second contactor to cause it to remain in open position after it has been moved into such position, whereby the first contactor is moved to open position at the lower maintained temperature, the energization of the heating element being continued by the second contactor until a peak temperature is reached whereupon the heating element is deenergized by said second contactor, after which the first contactor is sequentially energized and deenergized by its cooperating thermostat to maintain a lower temperature in the cooking chamber.

4. A device as set forth in claim 3 in which the means for rendering the respective contactors effective and ineffective include manually-actuable switches for controlling the circuits of the contactor coils.

5. In an electric cooking appliance including a cooking chamber and a heating element therefor, means for obtaining a peak temperature and a subsequent maintained lower temperature in the cooking chamber, said means comprising a first contactor for controlling the energization of the heating element, a thermostat, operable at said lower maintained temperature for controlling the first contactor, a second contactor for individually controlling the energization of the heating element and including means to limit its operation to one cycle only, a thermostat, operable at the peak temperature, for controlling the second contactor and electric conductors connecting the two contactors in parallel with each other, the second contactor being controlled by its cooperating thermostat to continue the energization of the heating element until the peak temperature is reached and then moving to and remaining in open position, after which the first contactor is controlled by its cooperating thermostat to energize and deenergize the heating element to maintain the said lower temperature in the cooking chamber.

6. An appliance as set forth in claim 5 in which the thermostats short-circuit the coils of the contactors to cause them to move to open position.

7. An appliance as set forth in claim 2 in which the thermostats interrupt the circuits of the coils of the contactors to cause them to move to open position.

8. An appliance as set forth in claim 2 in which the means for rendering ineffective the contactor controlled by the thermostat operable at the higher temperature includes a manually-actuable switch and holding circuit for the contactor coil.

9. An appliance as set forth in claim 2 in which the means for rendering ineffective the contactor controlled by the thermostat operable at the higher temperature includes a manually releasable latch for holding the contactor in open circuit.

10. In an electric cooking appliance including a cooking chamber and a heating element therefor, means for controlling the heating element to obtain a peak temperature and then a lower maintained temperature in the cooking chamber, said means including a pair of contactors, having energizing coils, for individually controlling the energization of the heating element, a pair of thermally-actuable switches responsive to chamber temperature and operable respectively at a desired peak temperature and at a desired maintained temperature, connections between the respective contactor coils and the respective thermal switches and means preventing reclosing of the contactor controlled by the peak temperature thermally-actuable switch by the action of said switch after having been moved into open position thereby.

HERMAN M. BIEBEL.